United States Patent
Unrein et al.

(10) Patent No.: US 8,429,624 B2
(45) Date of Patent: Apr. 23, 2013

(54) APPLICATION PROGRAMMING INTERFACE (API) ROUTER IMPLEMENTATION AND METHOD

(75) Inventors: Jason Unrein, Wichita, KS (US); Louis Henry Odenwald, Jr., Wichita, KS (US); Rose George, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 332 days.

(21) Appl. No.: 12/857,941

(22) Filed: Aug. 17, 2010

(65) Prior Publication Data

US 2012/0047494 A1 Feb. 23, 2012

(51) Int. Cl.
*G06F 9/45* (2006.01)
(52) U.S. Cl.
USPC ........... 717/137; 717/715; 717/136; 717/114; 717/117; 709/203
(58) Field of Classification Search .................. 717/114, 717/116, 117, 140, 137
See application file for complete search history.

(56) References Cited

U.S. PATENT DOCUMENTS

| | | | |
|---|---|---|---|
| 8,065,660 B1 * | 11/2011 | Tanner et al. | 717/121 |
| 8,191,040 B2 * | 5/2012 | Hejlsberg et al. | 717/114 |
| 2005/0246716 A1 * | 11/2005 | Smith et al. | 719/315 |
| 2005/0273772 A1 * | 12/2005 | Matsakis et al. | 717/136 |
| 2007/0055964 A1 * | 3/2007 | Mirkazemi et al. | 717/140 |
| 2010/0325620 A1 * | 12/2010 | Rohde et al. | 717/154 |
| 2011/0283270 A1 * | 11/2011 | Gass et al. | 717/168 |

* cited by examiner

*Primary Examiner* — Vanel Frenel (57) ABSTRACT

An application programming interface (API) implementation that can interface between an application and a programming library. The implementation includes a Function Router Wrapper that receives a formatted string from the application. The formatted string includes a function name element filled with a function name, an input element filled with function input parameters, and an unfilled output element. The Function Router Wrapper converts the formatted string and passes it to a Function Router, which parses the converted formatted string to access the function name and the function input parameters. The Function Router calls a library function based on the accessed information. When the called library function is completed, the Function Router collects generated function outputs and embeds them into the formatted string output element. The Function Router passes the formatted string back up to the Function Router Wrapper, which converts the formatted string and passes it back up to the application.

21 Claims, 4 Drawing Sheets

APPLICATION PROGRAMMING INTERFACE (API) ROUTER IMPLEMENTATION AND METHOD

BACKGROUND OF THE INVENTION

1. Field of the Invention

The invention relates to application programming interfaces (APIs). More particularly, the invention relates to language independent API implementations and methods.

2. Description of the Related Art

Within a computer system, an application (or application software) typically is software meant to perform a specific task for the computer user. Also, within a computer system, a programming library includes a collection of functions that are useful in the development and execution of the application software. Conventionally, programming libraries provide access to their functions via an Application Program Interface (API), and through API calls or functions calls that accept various input parameters in the correct syntax for the language in which the API is written. However, such approach to accessing library functions does not allow relatively easy cross-language usage, e.g., an application written in a first programming language and a library written in a second programming language. In such cases, different interpreters and possibly other computer system components must be used to convert one language's data structures to another language's data structures. Such process can be relatively error prone and time consuming. Also, depending on the complexity of the library, the number of functions for the API could be relatively large, which increases the difficulty of building the interpreters.

Conventional programming libraries are written to targeted languages and in a manner that performs the needed functions for the particular application. However, when another language needs to attach to the particular programming library, the new or other language uses existing tools provided with the language or uses external tools to wrap around the library. SWIG (Simplified Wrapper and Interface Generator) and JNI (Java Native Interface) are examples of inter-language communication software development tools that connect programs written in a (first) lower level programming language to a (second) higher level programming language. However, beyond providing access to the functions and data in the other language, such inter-language communication tools do not offer much in terms of providing relatively easy cross-language usage.

Conventional solutions for the difficulties of cross-language usage typically only ease the process of creating an inter-language communication tool, which still is troublesome. Depending on the size of the API, the task of communicating across different programming languages could be from a few functions and data classes to a few hundred or more functions and data classes. As the size of the API grows, so does the time required to build the interface between the application and the library, as well as the overall complexity of the interface. Also, different versions of data structures or functions may exist, which compounds the existing difficulties. Using conventional methods, an inter-language interface becomes essentially a rewrite of the external API to properly convert all data types and functions to a usable version in the programming language of the application.

Conventional approaches can be further complicated when modifications are made to the API. When a modification to the API occurs, programming developers must also change the interface and the application to accommodate the API modification. Furthermore, given the relatively complex nature of many conventional interfaces, API modification can result in the introduction of inadvertent bugs into the interface layer by programming developers. Depending on the scope of the modification, the amount of work could be reduced by a relatively significant amount if the interface used a language independent communication scheme.

SUMMARY OF THE INVENTION

The invention is embodied in a language independent application programming interface (API) implementation that can interface between an application (application software) and a library (programming library). The implementation includes a Function Router Wrapper that receives from the application a formatted string, such as a string formatted in an XML-based format. The formatted string includes a function name element filled with a function name, an input element filled with one or more function input parameters, and an unfilled output element. The Function Router Wrapper converts the received formatted string and passes the converted formatted string to a Function Router. The Function Router, which can be part of the programming library, parses the converted formatted string to identify and access the function name from the function name element and the function input parameters from the input element. Based on the identified function name and function input parameters, the Function Router calls a library function from the programming library. When the performance of the called library function has been completed, the Function Router collects one or more function outputs generated by the called library function. The Function Router then embeds the collected function outputs into the output element of the formatted string, and passes the resulting formatted string back to the Function Router Wrapper. The Function Router Wrapper converts the formatted string, if necessary, and passes the resulting formatted string back to the application.

The language independent API implementation provides a method to produce a working interface between computing elements having different languages in a reduced time frame, compared to conventional interface implementations. The inventive language independent API implementation uses a single API call that accepts two standard strings for input and output elements. Accordingly, one advantage of the inventive implementation is the reduction in the number of changes that potentially need to be made for an API modification. Also, the overall complexity or the code is reduced. These advantages and other advantages typically result in reduced development time for the building of the working interface.

DETAILED DESCRIPTION OF EXEMPLARY EMBODIMENTS

In the following description, like reference numerals indicate like components to enhance the understanding of the invention through the description of the drawings. Also, although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

As used in this description, the terms "component," "module," and "system," are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes, such as in accordance with a signal having one or more data packets, e.g., data from one component interacting with another component in a local system, distributed system, and/or across a network, such as the Internet, with other systems by way of the signal.

Figure 1:
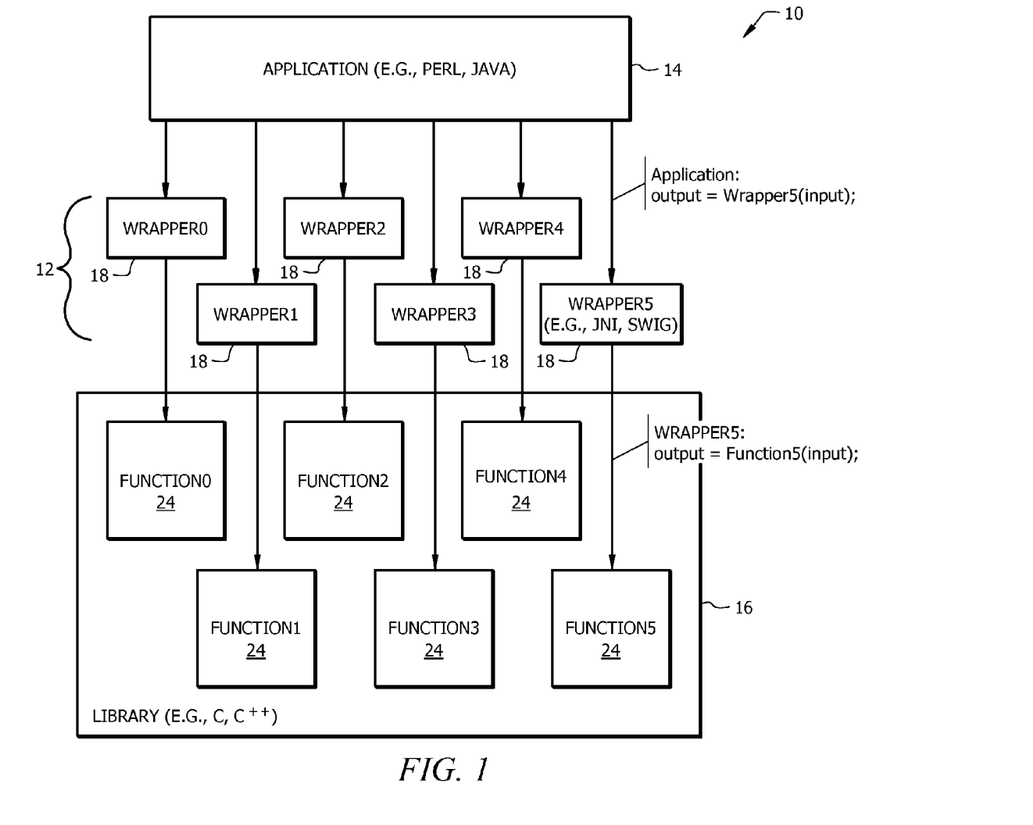
FIG. 1 is a schematic view of an Application Program Interface (API) implementation according to a conventional arrangement or configuration, e.g., an implementation between an application and a programming library.

Referring now to FIG. 1, shown is a schematic view of an Application Program Interface (API) interface implementation 10 according to a conventional arrangement or configuration, e.g., a conventional API implementation between an application and a library. In this conventional implementation, the API implementation uses inter-language communication software development tools, such as SWIG (Simplified Wrapper and Interface Generator) or JNI (Java Native Interface), to connect programs written in a (first) lower level programming language, such as the programming language of the library, to a (second) higher level programming language, such as the programming language of the application.

The conventional API implementation 10 includes an API interface 12 coupled between an application 14 and a (programming) library 16. The API interface 12 typically is a plurality of wrappers 18, such as Wrapper0 through Wrapper5, that are developed from an inter-language communication software development tool, such as SWIG or JNI. In this manner, the application 14 interfaces with the library 16 via the wrappers 18, e.g., via SWIG wrappers or JNI wrappers.

The application 14 can be any suitable application that is supported by the particular language of the wrappers 18. For example, the application 14 can be a Perl application, a Java application or other suitable application or application software supported by the wrappers 18. The library 16, which can be any suitable programming library, such as a C or C++ programming library, has a plurality of functions 24, such as such as Function0 through Function5, that collectively act as an API for the library 16 to the application 14, via the wrappers 18.

As discussed hereinabove, when the application 14 and the library 16 are not written in the same the same programming language, but the application needs to attach to the particular programming library, the application 14 uses SWIG, JNI or other suitable tool to wrap around the library 16. More specifically, the wrappers 18 convert function calls from the native language of the application 14 to the native language of the library 16. According to this conventional implementation, each function in the library 16 requires its own unique wrapper to translate the inputs and output of the particular function from the native language of the application 14 to the native language of the library 16. As part of a conventional API call from the application 14 to the library 16, the information from the application 14 to one of the wrappers 18, e.g., Wrapper5, typically has the following format: Application: output=Wrapper5(input);. Also, the information from the Wrapper5 to one of the functions, e.g., Function5, typically has the following format: Wrapper5: output=Function5(input);. Therefore, conventionally, adjustments to the wrappers 18 need to be made each and every time one or more functions 24 of the API of the library 16 changes.

According to embodiments of the invention, implementing a library is done with a single API wrapper or function, i.e., a Function Router Wrapper (FRW), rather than a plurality of wrappers. The Function Router Wrapper (FRW), which is associated with a Function Router added to the library 16, is configured to accept an XML, XML-based or other suitably formatted input and output. As is known, Extensible Markup Language (XML) is a document encoding standard for providing information on the Internet.

The XML or XML-based input to the Function Router Wrapper (from the application) contains the internal API function or the external API function that a program written in the same language would call, along with any parameters that may be required. If versioning is needed, e.g., for different versions of data structures and/or functions, a version or other appropriate version information can be passed in as well. The Function Router Wrapper converts the input information to a standard string format, such as ASCII, Unicode or MIME (Multipurpose Internet Mail Extensions). The XML or XML-based output received by the Function Router Wrapper (from the library) is similar to the input in that the output contains output information converted to the standard string format of choice, and any version information (if required). Because the input/output format is XML, or in an XML-based or other suitable format, data structures in the language of the application and data structures in the language of the library can be represented in an XML or XML-based format relatively easily.

According to embodiments of the invention, the Function Router Wrapper can coexist with conventional API functions. For example, the Function Router Wrapper can be used as the interface for an application to a library of a different language, but other API functions still can exist for applications that are written in the same language as the language of the library. Also, the Function Router Wrapper still can involve the use of appropriate language interfaces, e.g., SWIG or JNI, however, such use has been reduced to a single API function call with a standard string as the input and the output. Thus, the development time required to produce the Function Router Wrapper is relatively minimal compared to interface development times of conventional implementations.

Figure 2:
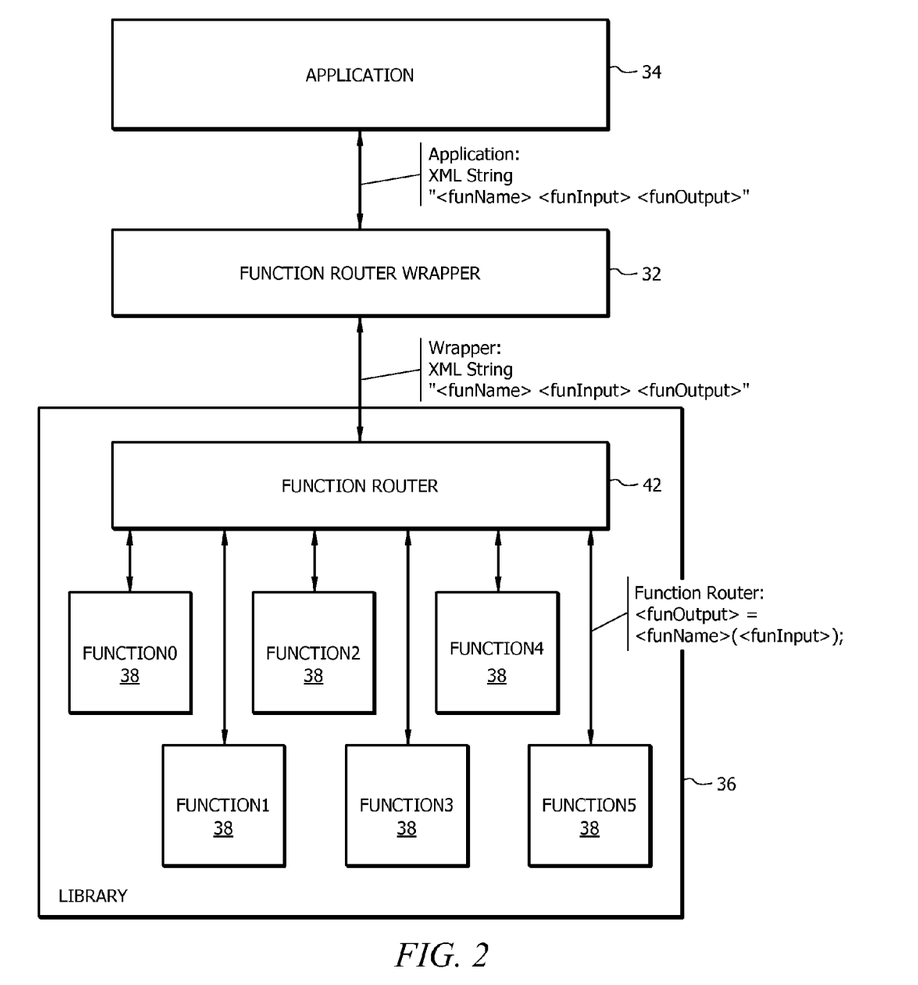
FIG. 2 is a schematic view of an API implementation according to embodiments of the invention, e.g., an implementation between an application and a programming library.

Referring now to FIG. 2, shown is a schematic view of an API interface implementation 30 according to embodiments of the invention. For example, the API interface implementation 30 involves interfacing between an application (or application software) and a programming library. The API interface implementation 30 includes a Function Router Wrapper 32, which can be coupled between an application 34 and a library or programming library 36. As discussed hereinabove, the application 34 can be a Perl application, a Java application or any other suitable application. Also, the library 36 can be any suitable programming library, such as a C or C++ programming library.

The library 36 includes a plurality of functions 38, such as Function0 through Function5, that otherwise collectively act as an API to the application 34 and other applications. However, according to embodiments of the invention, the library 36 has added thereto a Function Router 42, which, as will be discussed in greater detail below, becomes the sole API or interface for the library 36, e.g., the API or interface between the library 36 and the application 34. In this manner, instead of using a plurality of individual function wrappers, as in conventional implementations, the API interface implementation 30 according to embodiments of the invention uses a single wrapper, i.e., the Function Router Wrapper 32, and its association with the Function Router 42, as the interface between the application 34 and the library 36.

In operation, as part of an API call or function call from the application 34 to the library 36, the application 34 passes a formatted string to the Function Router Wrapper 32. As discussed hereinabove, the formatted string can be XML or XML-based string, or other suitably formatted string. Although the use of XML or an XML-based format for formatting the formatted string is not mandatory, the formatted string should be built in such a way as to associate data with purpose. That is, a context should be stored with the data so that when the data is passed via the formatted string, the Function Router 42 can understand what the data corresponds to by breaking down the structure into the appropriate language's binary structure.

The formatted string minimally contains elements for the call function's name, the function's inputs, and a function's output. The function name element of the function and the input element of the function are filled in by the application 34. The output element of the function is filled in by the Function Router 42, as will be discussed in greater detail hereinbelow. Therefore, the formatted string passed from the application 34 to the Function Router Wrapper 32 includes a function name element filled with a function name, an input element filled with one or more function input parameters, and an unfilled output element. The formatted string passed from the application 34 to the Function Router Wrapper 32 can have the following format: Application: XML string "<funName><funInput><funOutput>", where <funName> is the function name element, <funInput> is the input element and <funOutput> is the output element. However, such format is not always necessary. For example, if a particular function does not require an input and there is no output, the formatted string passed from the application 34 to the Function Router Wrapper 32 can have the following format: Application: XML string "<funName>".

According to embodiments of the invention, the Function Router Wrapper 32 accepts a formatted string received from the application 34, performs any string conversions that may be needed for communication between the language of the application 34 and the language of the library 36, and passes the converted formatted string to the Function Router 42. In this manner, the Function Router Wrapper 32 accepts a formatted string from the application 34 and provides the means for the application 34 to direct the function call to the Function Router 42. The converted formatted string passed from the Function Router Wrapper 32 to the Function Router 42 has the following format: Wrapper: XML string "<funName><funInput><funOutput>", where <funName> is the function name element, <funInput> is the input element and <funOutput> is the output element. Also, as discussed in greater detail hereinbelow, according to embodiments of the invention, the Function Router Wrapper 32 passes formatted strings received from the Function Router 42 back to the application 34.

The Function Router Wrapper 32 does not have any other primary purposes. The Function Router Wrapper 32 is a generic wrapper, and the Function Router Wrapper 32 typically does not care about what information is in the formatted string that the Function Router Wrapper 32 is passing between the application 34 and the Function Router 42. As just described, the Function Router Wrapper 32 gets a suitably formatted string from the application 34, performs any necessary string conversions, and passes the converted formatted string to the Function Router 42. As will be discussed in greater detail hereinbelow, the Function Router 42 collects outputs from the called library function, fills in the output element of the formatted string with the appropriate output element information, and then passes the formatted string back to the Function Router Wrapper 32. The Function Router Wrapper 32 passes the formatted string received from the Function Router 42 back up to the application 34. Therefore, as discussed, the Function Router Wrapper 32 does what is required for the application 34 to send and receive a block of data to the particular function call of the library 36.

According to embodiments of the invention, the Function Router 42 typically is part of library 36, e.g., the Function Router 42 is added to the library 36. As the sole interface or API for the library 36, the Function Router 42 performs the interfacing operations between the library 36 and any non-library applications, such as the application 34. Accordingly, the Function Router 42 is configured appropriately to perform these functions. Also, as discussed hereinabove, the Function Router Wrapper 32 is a generic wrapper, and does not care about what information is in the formatted strings passing between the application 34 and the Function Router 42. Thus, any changes that might be made to the API of the library 36 (i.e., the Function Router 42) are not reflected in the Function Router Wrapper 32.

Figure 3:
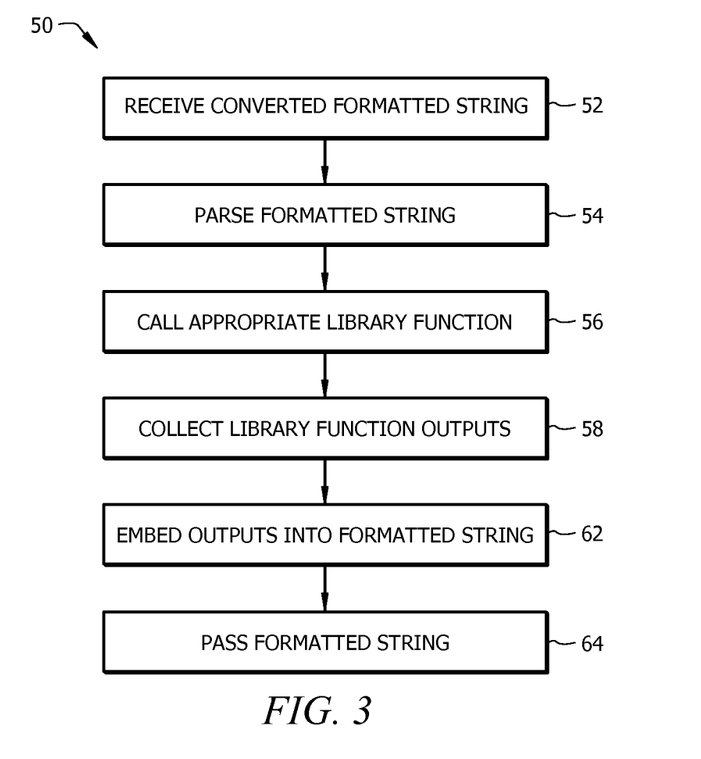
FIG. 3 is a block diagram of an API interfacing method according to embodiments of the invention, such as between an application and a programming library.

Referring now to FIG. 3, shown is a block diagram of an API interfacing method 50 according to embodiments of the invention. That is, the method 50 includes steps performed by the Function Router 42.

The method includes a step 52 of receiving a converted formatted string. The Function Router 42 is appropriately configured to receive a converted formatted string from the Function Router Wrapper 32. As discussed hereinabove, the Function Router Wrapper 32 receives a formatted string form the application 34, and converts the formatted string appropriately before passing the converted formatted string to the Function Router 42. As discussed hereinabove, the converted formatted string passed from the Function Router Wrapper 32 to the Function Router 42 can have the following format: Wrapper: XML string "<funName><funInput><funOutput>", where <funName> is the function name element, <funInput> is the input element and <funOutput> is the output element.

The method 50 also includes a step 54 of parsing the converted formatted string. Once the Function Router 42 receives the converted formatted string (from the Function Router Wrapper 32), the Function Router 42 parses the string to separate, identify and provide access to the information in the various elements of the formatted string, e.g., the information in the function name element and the input element. Parsing also performs the necessary formatting and conversion. The Function Router 42 is configured to parse the converted formatted string in any suitable manner that separates, identifies and provides suitable access to the information in the converted formatted string.

The method 50 also includes a step 56 of calling an appropriate library function. Once the Function Router 42 parses the converted formatted string, the Function Router 42 calls the appropriate library function, e.g., one of the library functions 38 (Function0 through Function5), based on the information accessed from the function name element portion of the formatted string. The Function Router 42 also supplies the function's input element information, which the Function Router 42 accessed as part of the string parsing step 54. For example, the information from the Function Router 42 to the called function 38 has the following format: Function Router: <funOutput>=<funName>(<funInput>).

The method 50 also includes a step 58 of collecting library function outputs. When the library function called by the Function Router 42 is performed, one or more function outputs are generated by the particular library function. Once the called library function is performed, the Function Router 42 collects the function outputs that are generated by the called library function.

The method 50 also includes a step 62 of embedding library function outputs into the formatted string. Once the function outputs from the called library function are collected by the Function Router 42, the Function Router 42 embeds or fills in the collected function outputs into the output element portion of the formatted string. Like the information from the Function Router 42 to the called function 38, the information sent back from the called function 38 to the Function Router 42 has the following format: Function Router: <funOutput>=<funName>(<funInput>).

The method 50 also includes a step 64 of passing the formatted string. Once the embedding step 62 is performed and the function outputs from the called library function are embedded or filled into the output element portion of the formatted string, the Function Router 42 passes the formatted string back to the Function Router Wrapper 32. As discussed hereinabove, the Function Router Wrapper 32 passes the formatted string received from the Function Router 42 back up to the application 34. The formatted string passed from the Function Router 42 to the Function Router Wrapper 32, and ultimately to the application 34, has its output element filled with one or more generated outputs from the called library function.

As discussed hereinabove, the Function Router 42 typically is part of the library 36 or, alternatively, coupled to the library 36. Specifically, the Function Router 42 is the part of the library 36 that interfaces with the Function Router Wrapper 32. The input/output interface (i.e., API) between the Function Router 42 and the Function Router Wrapper 32 remains constant. Therefore, any changes to other APIs within the library 36 are reflected in changes internal to the Function Router 42, but are not exposed to the Function Router Wrapper 32. Hence, according to embodiments of the invention, any API changes remain isolated within the library 36.

The following is an example API call from the application to the library via the API interface implementation according to embodiments of the invention:

```
<api-call>
    <function>crypt</function>
    <parameters>
        <array type="u8" name="key"
        length="13">rasmuslerdorf</array>
        <array type="u8" name="salt" length="2">rl</array>
    </parameters>
```

-continued

```
    <note>prototype: char *crypt(const char *key, const char
    *salt);</note>
<api-call>
```

The following is an example API return to the application via the API interface implementation according to embodiments of the invention:

```
<api-return>
    <function>crypt</function>
    <returns>
        <array type="u8" name="encrypted">rl.3StKT.4T8M</array>
    </returns>
<api-return>
```

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter," "then," "next," and other similar words are not intended to limit the order of the steps. These words simply are used to guide the reader through the description of the exemplary method. Also, one of ordinary skill in programming will be able to write computer code or identify appropriate hardware and/or circuits to implement the disclosed invention without difficulty, based on the flow charts and associated description in this specification. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures, which may illustrate various process flows.

Figure 4:
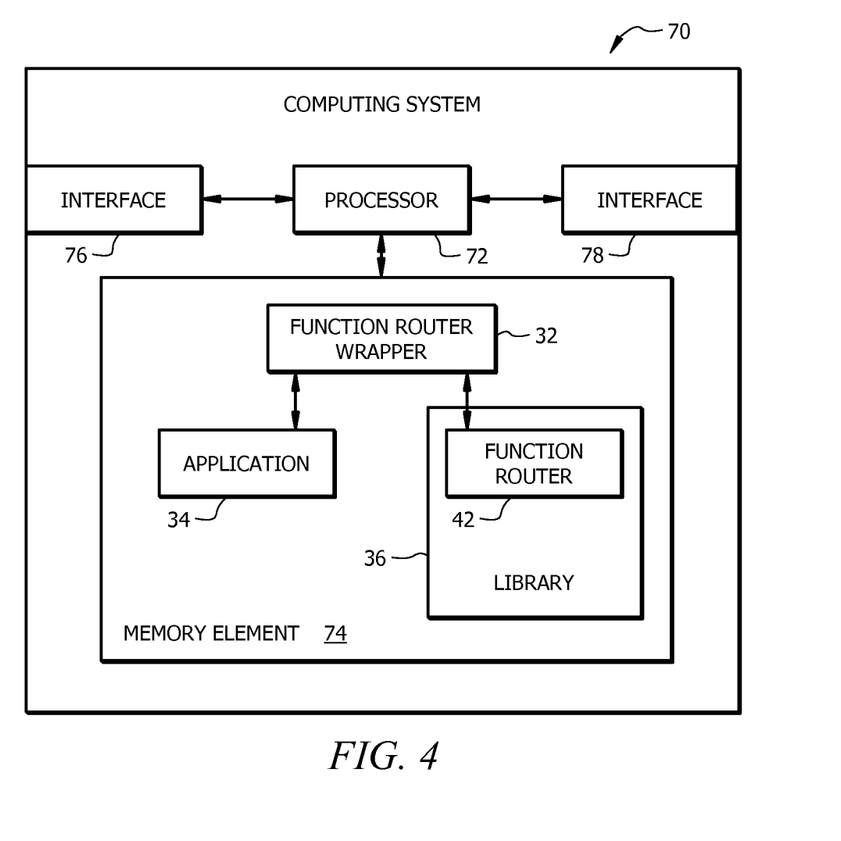
FIG. 4 is a block diagram of a computing system for performing the API interfacing methods according to embodiments of the invention.

Referring now to FIG. 4, shown is a block diagram of a computing device or system 70 for performing the API interfacing methods according to embodiments of the invention. The computing system 70 can be partially or completely any suitable device or subsystem (or portion thereof) for receiving, storing, processing, and/or transmitting data.

The computing system 70 includes a controller or processor 72 and a data storage element or memory device 74 coupled to the processor 72. In general, the processor 72 processes data and other information received and/or generated by the computing system 70. The processor 72 can be central processing unit (CPU) that includes any digital processing device, such as a microprocessor, finite state machine (FSM), digital signal processor (DSP), application specific integrated circuit (ASIC) and/or general purpose computer. In addition to the computing device 70 having the data memory device 24, the processor 72 can include at least one type of memory or memory unit (not shown) and a storage unit or data storage unit coupled to the processor for storing processing instructions and/or information received and/or created by the computing system 70. Within the computing system device 70, the memory element 74 stores all or a portion of at least one of the application 34, the Function Router Wrapper 32 and the library 36 (including the Function Router 42).

The computing system 70 also can include one or more input and/or output interfaces for receiving and/or transmitting data. For example, the processor 72 and other components in the computing system 70 can be coupled between a receive interface 76 and a transmit interface 78. It should be understood that one or more of the interfaces 76, 78 can be a single input/output interface (e.g., transceiver) coupled to the processor 72 and/or other components in the computing system 70.

One or more of the processor 72, the memory element 74, and the interfaces 76, 78 can be comprised partially or completely of any suitable structure or arrangement, e.g., one or more integrated circuits. Also, it should be understood that the computing system 70 includes other components, hardware and software (not shown) that are used for the operation of other features and functions of the computing system 70 not specifically described herein.

The computing system 70 can be partially or completely configured in the form of hardware circuitry and/or other hardware components within a larger device or group of components. Alternatively, the computing system 70 can be partially or completely configured in the form of software, e.g., as processing instructions and/or one or more sets of logic or computer code. In such configuration, the logic or processing instructions typically are stored in a data storage device, e.g., the memory element 74 or other suitable data storage device (not shown). The data storage device typically is coupled to a processor or controller, e.g., the processor 72. The processor 72 accesses the necessary instructions from the data storage device and executes the instructions or transfers the instructions to the appropriate location within the computing system 70.

In one or more aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

It will be apparent to those skilled in the art that many changes and substitutions can be made to the embodiments of the invention herein described without departing from the spirit and scope of the invention as defined by the appended claims and their full scope of equivalents.

The invention claimed is:

1. A computing device comprising a processor operating with an operating system that includes an application programming interface (API) embodied in at least one computer-readable storage media, the application programming interface (API) comprising:
    a Function Router Wrapper configured to receive from an application coupled thereto a formatted string having a function name element filled with a function name, an input element filled with at least one function input parameter, and an output element, wherein the Function Router Wrapper is configured to generate a converted formatted string; and
    a Function Router coupled to the Function Router Wrapper and configured to receive the converted formatted string from the Function Router Wrapper, wherein the Function Router is included within a programming library having a plurality of library functions,
    wherein the Function Router is configured to parse the converted formatted string to identify the function name from the function name element and to identify the at least one function input parameter from the input element,
    wherein the Function Router is configured to call a library function from the programming library based on the function name identified by the Function Router and based on the at least one function input parameter identified by the Function Router,
    wherein the Function Router is configured to collect at least one function output generated by the called library function,
    wherein the Function Router is configured to embed the at least one function output generated by the called library function into the output element of the formatted string,
    wherein the Function Router is configured to pass the formatted string back to the Function Router Wrapper, and
    wherein the Function Router Wrapper is configured to pass the formatted string received from the Function Router to the application.

2. The interface as recited in claim 1, wherein at least a portion of the programming language of the application and at least a portion of the programming language of the library are different programming languages, and wherein the Function Router Wrapper converts the formatted string in such a way that the contents of the function name element, the input element and the output element can be read by the application and the Function Router.

3. The interface as recited in claim 1, wherein the Function Router Wrapper converts the formatted string received from the application into a standard string format.

4. The interface as recited in claim 3, wherein the standard string format is selected from a group consisting of ASCII, Unicode and MIME.

5. The interface as recited in claim 1, wherein the Function Router calls the library function from among a plurality of library functions within a programming library.

6. The interface as recited in claim 1, wherein the Function Router is part of a programming library that includes a plurality of library functions.

7. The interface as recited in claim 1, wherein the formatted string includes at least one of data structure versioning information and function versioning information.

8. The interface as recited in claim 1, wherein the formatted string is an XML or XML-based formatted string.

9. A computing architecture implemented at least in part by a computing device, comprising:
    at least one computing application configured at least partially in a first programming language to perform at least one computing task, wherein the computing application is configured to generate at least one formatted string having a function name element filled with a function name, an input element filled with at least one function input parameter, and an output element;
    at least one programming library having a plurality of library functions written in a second programming language, wherein the programming library includes a Function Router coupled to the plurality of functions; and
    a Function Router Wrapper configured to receive the formatted string from the application, wherein the Function Router Wrapper is configured to convert the formatted string to a standard string format to generate a converted formatted string, and wherein the Function Router Wrapper is configured to pass the converted formatted string to the Function Router, wherein the Function Router is configured to receive the converted formatted string from the Function Router Wrapper, wherein the Function Router is configured to parse the converted formatted string to identify a function name from the function name element and to identify at least one function input parameter from the input element, wherein the Function Router is configured to call one of the plurality of library functions from the programming library based on the function name identified by the Function Router and based on the at least one function input parameter identified by the Function Router, wherein the Function Router is configured to collect at least one function output generated by the called library function, wherein the Function Router is configured to embed the at least one function output collected by the Function Router into the output element of the formatted string, wherein the Function Router is configured to pass the formatted string back to the Function Router Wrapper, wherein the output element of the formatted string includes the at least one function output, and wherein the Function Router Wrapper is configured to pass the formatted string received from the Function Router to the application.

10. The computing architecture as recited in claim 9, wherein the standard string format is selected from a group consisting of ASCII, Unicode and MIME.

11. The computing architecture as recited in claim 9, wherein the Function Router is part of the programming library.

12. The computing architecture as recited in claim 9, wherein the formatted string includes at least one of data structure versioning information and function versioning information.

13. The computing architecture as recited in claim 9, wherein the formatted string is an XML or XML-based formatted string.

14. A computer-implemented method for interfacing between an application and a programming library stored within a computing system, the computing system having a processor configured to execute the application to access functions within the programming library, the method comprising:

receiving from the application by a Function Router Wrapper a formatted string, the Function Router Wrapper configured to wrap the formatted string to generate a converted format string;

receiving from the Function Router Wrapper by a Function Router the converted formatted string having a function name element filled with a function name, an input element filled with at least one function input parameter, and an output element;

parsing by the Function Router the converted formatted string to identify a function name from the function name element and to identify at least one function input parameter from the input element;

calling by the Function Router one of a plurality of library functions of the programming library based on the identified function name and the at least one identified function input parameter;

collecting by the Function Router at least one function output generated by the called library function;

embedding by the Function Router the at least one function output collected by the Function Router into the output element of the formatted string; and passing by the Function Router the formatted string to the Function Router Wrapper, wherein the output element of the formatted string includes the at least one function output.

15. The method as recited in claim 14, further comprising passing by the Function Router Wrapper to the application the formatted string received from the Function Router.

16. The method as recited in claim 14, wherein the standard string format is selected from a group consisting of ASCII, Unicode and MIME.

17. The method as recited in claim 14, wherein the Function Router is part of the programming library.

18. The method as recited in claim 14, wherein the formatted string includes at least one of data structure versioning information and function versioning information.

19. The method as recited in claim 14, wherein the formatted string is an XML or XML-based formatted string.

20. A computer readable medium storing instructions that carry out a method for interfacing between an application and a programming library, the computer readable medium comprising:

instructions for receiving from the application by a Function Router Wrapper a formatted string, the Function Router Wrapper configured to wrap the formatted string to generate a converted format string;

instructions for receiving from the Function Router Wrapper by a Function Router a converted formatted string having a function name element filled with a function name, an input element filled with at least one function input parameter, and an output element;

instructions for parsing by the Function Router the converted formatted string to identify a function name from the function name element and to identify at least one function input parameter from the input element;

instructions for calling by the Function Router one of a plurality of library functions of the programming library based on the identified function name and the at least one identified function input parameter;

instructions for collecting by the Function Router at least one function output generated by the called library function;

instructions for embedding by the Function Router the at least one function output collected by the Function Router into the output element of the formatted string; and instructions for passing by the Function Router the formatted string to the Function Router Wrapper, wherein the output element of the formatted string includes the at least one function output.

21. The computer readable medium as recited in claim 20, further comprising instructions for passing by the Function Router Wrapper to the application the formatted string received from the Function Router.

* * * * *